(12) United States Patent
Stroemberg

(10) Patent No.: US 12,470,035 B2
(45) Date of Patent: Nov. 11, 2025

(54) SILVER-DIAMOND HEATSINKS FOR OPTICAL DEVICES

(71) Applicant: Lumentum Operations LLC, San Jose, CA (US)

(72) Inventor: Christoffer Stroemberg, Schlieren (CH)

(73) Assignee: Lumentum Operations LLC, San Jose, CA (US)

(*) Notice: Subject to any disclaimer, the term of this patent is extended or adjusted under 35 U.S.C. 154(b) by 988 days.

(21) Appl. No.: 17/646,396

(22) Filed: Dec. 29, 2021

(65) Prior Publication Data
US 2023/0120272 A1    Apr. 20, 2023

Related U.S. Application Data

(60) Provisional application No. 63/262,609, filed on Oct. 15, 2021.

(51) Int. Cl.
| | | |
|---|---|---|
| H01S 3/04 | (2006.01) | |
| H01S 3/042 | (2006.01) | |
| H01S 3/06 | (2006.01) | |
| H01S 3/16 | (2006.01) | |

(52) U.S. Cl.
CPC ......... *H01S 3/0405* (2013.01); *H01S 3/0407* (2013.01); *H01S 3/042* (2013.01); *H01S 3/061* (2013.01); *H01S 3/1618* (2013.01); *H01S 3/1643* (2013.01)

(58) Field of Classification Search
CPC ...... H01S 3/0405; H01S 3/0407; H01S 3/042; H01S 3/061; H01S 3/1618; H01S 3/1643; H01S 3/025
See application file for complete search history.

(56) References Cited

U.S. PATENT DOCUMENTS

| | | | | |
|---|---|---|---|---|
| 4,429,394 | A * | 1/1984 | Guch, Jr. ............... | H01S 3/042 372/36 |
| 5,832,016 | A * | 11/1998 | Basu ................. | H01S 3/094084 372/36 |
| 11,824,324 | B2 * | 11/2023 | Strohmaier ......... | H01S 5/02476 |
| 2004/0183172 | A1 * | 9/2004 | Saito .................... | H01L 23/057 257/E23.189 |
| 2019/0206839 | A1 * | 7/2019 | Balakrishnan .......... | H01L 25/18 |
| 2020/0119510 | A1 * | 4/2020 | Stroemberg .......... | H01S 3/0623 |

* cited by examiner

*Primary Examiner* — Xinning(Tom) Niu
(74) *Attorney, Agent, or Firm* — Harrity & Harrity, LLP

(57) ABSTRACT

A heat sink assembly may include a first cooling stack. The first cooling stack may include a silver-diamond composite material. The heat sink assembly may include a second cooling stack. The second cooling stack may include the silver-diamond composite material. The heat sink assembly may include a crystal rod. The crystal rod may be an ytterbium-doped, yttrium-aluminum-garnet laser medium. The crystal rod may be at least partially sandwiched by the first cooling stack and the second cooling stack.

20 Claims, 7 Drawing Sheets

SILVER-DIAMOND HEATSINKS FOR OPTICAL DEVICES

CROSS-REFERENCE TO RELATED APPLICATION

This Patent application claims priority to U.S. Provisional Patent Application No. 63/262,609, filed on Oct. 15, 2021, and entitled "SILVER DIAMOND COMPOSITE HEAT SINK." The disclosure of the prior Application is considered part of and is incorporated by reference into this Patent Application.

TECHNICAL FIELD

The present disclosure relates generally to a heat sink assembly and to a heat sink assembly that includes a silver-diamond composite material for transferring heat between a crystal rod and a cooling block.

BACKGROUND

An optical device may include a crystal rod as a solid state lasing medium. The optical device may pump the crystal rod with very high energy to cause stimulated emission out of an end of the crystal rod. During optical pumping, a temperature of the crystal rod can increase, which may result in damage to the optical device or poor performance (e.g., an unintended alteration to an output of the optical device), among other examples. To achieve thermal management for the crystal rod, some optical devices include a heat sink assembly that surround the crystal rod and controls a temperature of the crystal rod. One example of a heat sink assembly is a copper heat sink assembly with water cooling. In this example, a copper heat sink element enables transfer of heat from the crystal rod to a cooling block. The cooling block interfaces with a water-based coolant that transfers heat away from the cooling block. In some cases, the copper heat sink and the cooling block may be a single body. For example, a copper heat sink may include integrated water channels or cooling fins. Alternatively, a copper heat sink may transfer heat without using water channels or cooling fins.

SUMMARY

In some implementations, a heat sink assembly includes a first cooling stack, wherein the first cooling stack includes a silver-diamond composite material; a second cooling stack, wherein the second cooling stack includes the silver-diamond composite material; and a crystal rod, wherein the crystal rod is an ytterbium-doped, yttrium-aluminum-garnet laser medium, and wherein the crystal rod is at least partially sandwiched by the first cooling stack and the second cooling stack.

In some implementations, a heat sink assembly includes a first cooling stack including a first metal-diamond composite section; a second cooling stack including a second metal-diamond composite section; and a crystal rod for a laser emitter, wherein the crystal rod is sandwiched between respective semi-circular cutouts of the first metal-diamond composite section and the second metal-diamond composite section such that ends of the crystal rod are exposed by the semi-circular cutouts.

In some implementations, a method includes aligning a crystalline orientation of a crystal rod with an orientation of a first cooling stack and a second cooling stack of a heat sink assembly, wherein the first cooling stack and the second cooling stack have respective faces formed from a silver-diamond composite material; and attaching the first cooling stack to the second cooling stack, such that the crystal rod in sandwiched between the first cooling stack and the second cooling stack and the crystalline orientation is maintained by the respective faces of the first cooling stack and the second cooling stack.

DETAILED DESCRIPTION

The following detailed description of example implementations refers to the accompanying drawings. The same reference numbers in different drawings may identify the same or similar elements.

Optical devices, such as lasers, may include heat sink assemblies for thermal management. A heat sink assembly may include a thermally conductive heat sink element and a cooling block. The conductive heat sink element may conduct heat away from a crystal rod of the optical device and toward the cooling block. The cooling block may interface with a coolant to remove heat from the optical device. Removing heat from the optical device reduces a likelihood of damage to the optical device and/or poor performance. In some cases, the conductive heat sink element is manufactured from copper to provide a relatively high level of thermal conductivity for thermal management for the optical device. However, for increasingly high energy systems, a level of thermal conductivity for copper may be insufficient to achieve thermal management for an optical device or may require an excessively large heat sink to achieve sufficient thermal management. Further, copper may have a poor coefficient of thermal expansion match to the crystal rod, thereby resulting in a possibility of damage from differential thermal expansion between the conductive heat sink and the crystal rod.

Some implementations described herein may provide a silver-diamond composite heat sink for optical devices. For example, a heat sink assembly for an optical device may include a silver-diamond composite heat sink element to provide thermal management for a crystal rod. In some implementations, the heat sink assembly may include another type of metal-diamond composite material for the heat sink element to provide a coefficient of thermal expansion (CTE) match with the crystal rod and/or to achieve a threshold level of thermal conductivity. In this way, the heat sink assembly provides improved thermal management with a reduced likelihood of damage from a CTE mismatch between the heat sink element and the crystal rod.

FIGS. 1A-1D are diagrams of an example heat sink assembly 100.

Figure 1A:
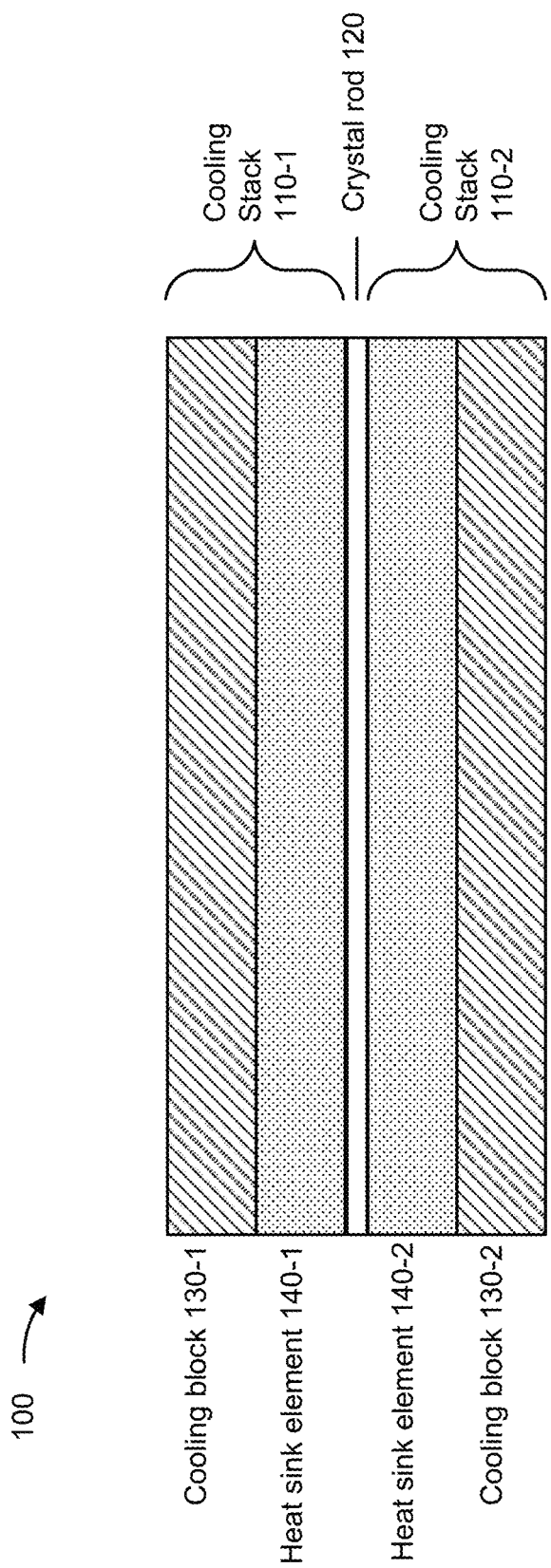
FIGS. 1A-1D are diagrams of an example heat sink assembly described herein.

As shown in FIG. 1A, in a cross-sectional side-view, heat sink assembly 100 may include a first cooling stack 110-1 and a second cooling stack 110-2 sandwiching a crystal rod 120. Each cooling stack 110 may include a respective cooling block 130 and heat sink element 140. For example, first cooling stack 110-1 includes cooling block 130-1 and heat sink element 140-1 and second cooling stack 110-2 includes cooling block 130-2 and heat sink element 140-2.

Figure 1B:
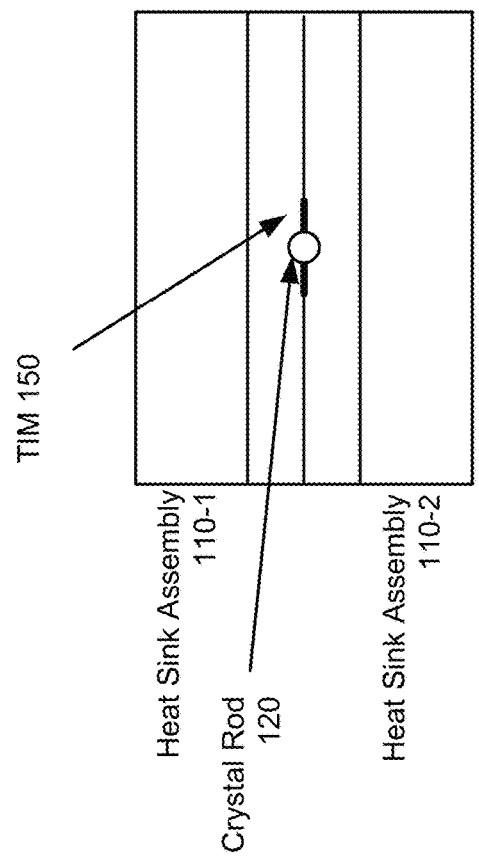
Figure 1C:
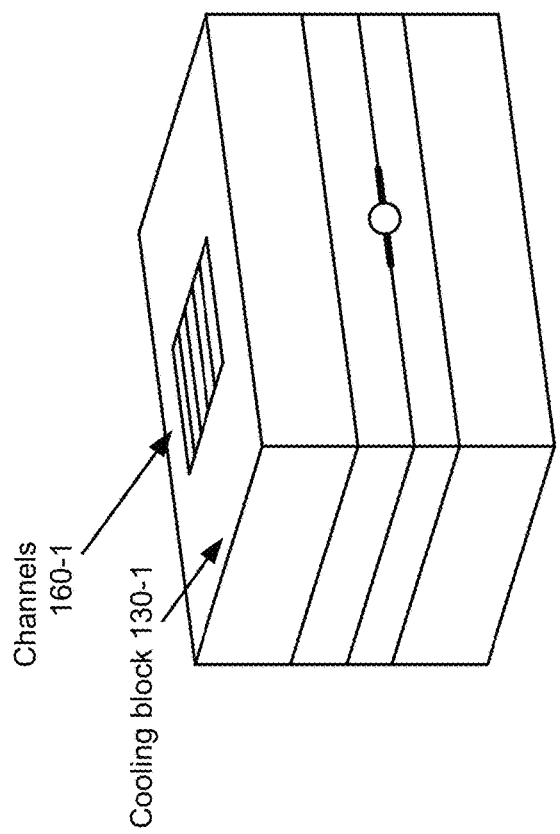
Figure 1D:
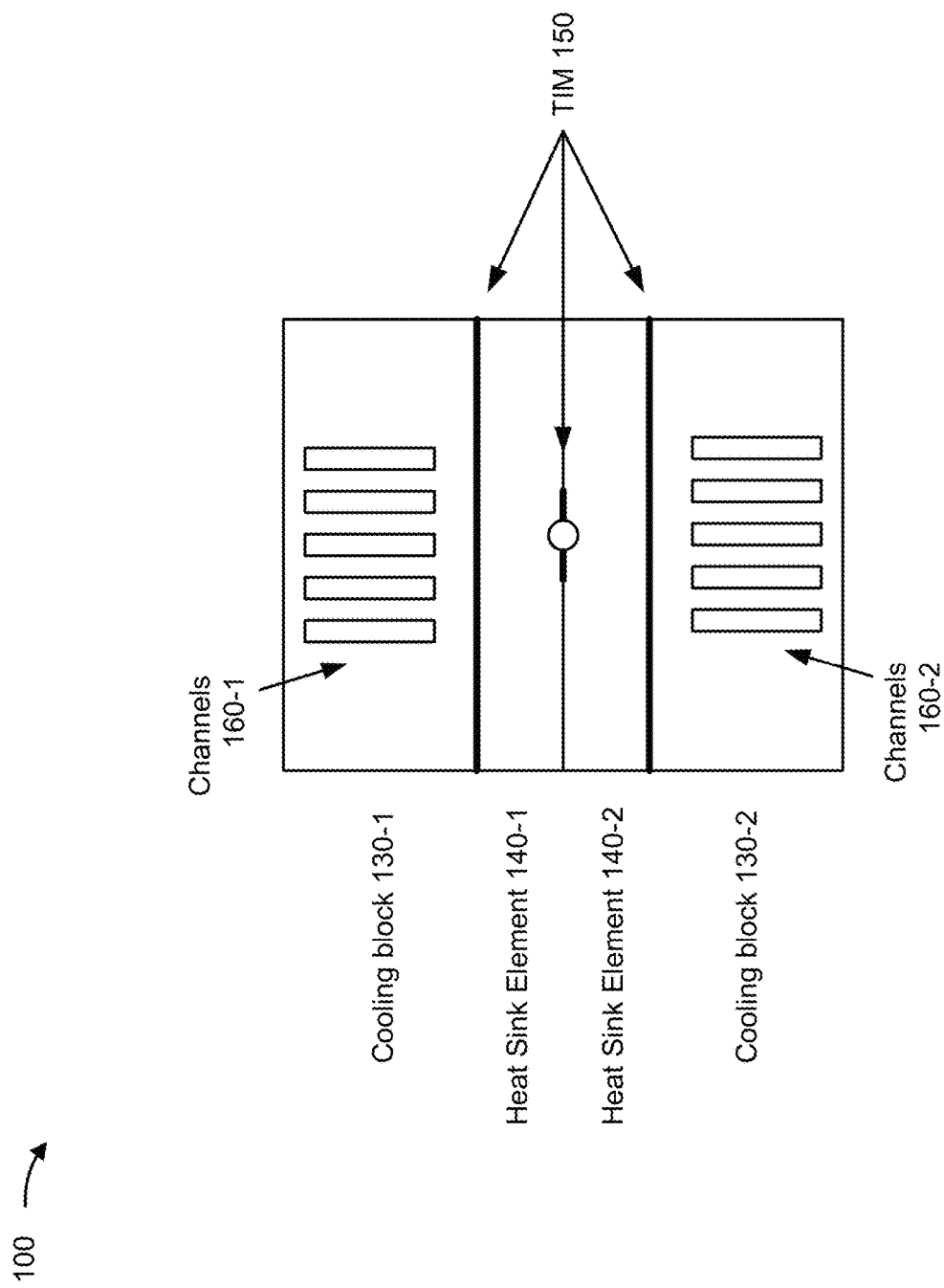

As shown in FIG. 1B, in a front-view, heat sink assembly 100 may include a thermal interface material (TIM) 150. As shown in FIGS. 1C and 1D, in a projection view and a cross-sectional front-view, respectively, heat sink assembly 100 may include a set of channels 160 in each cooling block 130. For example, cooling block 130-1 may include a first set of channels 160-1 and cooling block 130-2 may include a second set of channels 160-2. In some implementations, as shown in FIG. 1D, thermal interface material 150 may also be present at interfaces between cooling blocks 130 and heat sink elements 140. For example, thermal interface material 150 may be disposed between cooling block 130-1 and heat sink element 140-1 and between heat sink element 140-2 and cooling block 130-2. Thermal interface material 150 may include a solder material or another type of material for transferring heat between crystal rod 120 and heat sink elements 140 (and/or between heat sink elements 140 and cooling blocks 130), such as a phase change material, a gap filler, a thermal grease, a thermally conductive hardware material, an adhesive film, a thermal rubber pad, an adhesive tape, a paste, a putty, a gel, a potting compound, a liquid adhesive, a carbon-based material (e.g., a graphite material, such as pyrolytic graphite), an indium material, or a tin material, among other examples. Using a thermal interface material 150 may reduce a gap between a first face of a first body and a second face of a second body (e.g., a surface of crystal rod 120 and a first face of heat sink element 140 or a second face of heat sink element 140 and a surface of cooling block 130) from, for example, a millimeter gap to a micron gap (or smaller) or even to a zero gap (maximizing contact area), thereby improving an efficiency of thermal transfer between bodies.

In some implementations, crystal rod 120 may be a particular type of crystal rod. For example, crystal rod 120 may be an ytterbium-doped, yttrium-aluminum-garnet (Yb:YAG) laser medium that produces a beam when energy is applied to crystal rod 120. Additionally, or alternatively, crystal rod 120 may be another type of optical component that may be cooled by heat sink assembly 100. For example, heat sink assembly 100 may include and/or may attach to another type of crystal rod, another type of laser medium, or another type of emitter, among other examples.

In some implementations, a cooling block 130 and a set of channels 160 may be configured to receive a coolant. For example, channels 160 may be coolant channels that include an opening for receiving a liquid coolant. The liquid coolant may include water coolant, a water-based coolant, or another type of liquid coolant. In some implementations, heat sink assembly 100 may form and/or include a type of liquid cooling system, such as a recirculating chiller, a liquid-to-liquid cooling system, an ambient cooling system, a cold plate cooling system, or a heat exchanger cooling system, among other examples. Additionally, or alternatively, cooling block 130 and channels 160 may form an air-cooling system. For example, cooling block 130 may be an aluminum block with fins. Additionally, or alternatively, cooling block 130 and channels 160 may form a set of heat pipes, such as for a thermo-electric cooling (TEC) system. In some implementations, heat sink element 140 and cooling block 130 may be a single component.

In some implementations, heat sink elements 140 may include a particular type of material. For example, heat sink elements 140 may be a silver-diamond composite material. Additionally, or alternatively, heat sink elements 140 may be another type of metal-diamond composite material. For example, heat sink elements 140 may include an aluminum-diamond composite material, a copper-diamond composite material, or a magnesium-diamond composite material, among other examples. In some implementations, heat sink elements 140 may use a material (e.g., silver-diamond composite) that has diamond content in a range from 50% to 90% diamond content by volume, in a range from 50% to 80% diamond content by volume, or of 70% diamond content by volume, among other examples. Additionally, or alternatively, heat sink elements 140 may use a material (e.g., silver-diamond composite) that achieves a thermal conductivity value in a range from 200 Watts per meter Kelvin (W/m-K) to 1200 W/m-K, in a range from 400 W/m-K to 1000 W/m-K, or of 800 W/m-K. Additionally, or alternatively, heat sink elements 140 may use a material (e.g., silver-diamond composite) that has a coefficient of thermal expansion (CTE) in a range from 3 to 8, in a range from 5 to 8, or of 7.5. Moreover, the CTE of heat sink element 140 may match a CTE of crystal rod 120 to within 50%, within 25%, or within 10%, thereby reducing a likelihood of thermal stressing and associated thermal damage from differential thermal expansion. In this way, by using a metal-diamond composite material, such as silver-diamond composite among other examples, heat sink elements 140 may achieve a thermal conductivity that is approximately two times higher than that of a monolithic copper heat sink. Improving the thermal conductivity results in faster heat spreading from the crystal rod 120 and heating of coolant in cooling block 130 at a lower temperature differential between the coolant and crystal rod 120, thereby enabling more efficient cooling of the crystal rod 120 by heat sink assembly 100. Although certain ranges are described herein it is understood that other ranges may be possible.

In some implementations, heat sink elements 140 may have a gold-coated surface. For example, heat sink elements 140 may be a gold-coated, silver-diamond composite material or another type of gold-coated, metal-diamond composite material. Additionally, or alternatively, heat sink elements 140 may have another type of surface-plating or coating, such as nickel surface-plating or coating. By adding surface plating of a relatively inert, smooth, and/or durable material (e.g., gold or nickel, among other examples) to heat sink elements 140, heat sink assembly 100 may achieve enhanced solderability and/or adhesion with, for example, indium and avoid corrosion. Additionally, or alternatively, surface plating may achieve a higher degree of smoothness, thereby improving heat transfer from crystal rod 120 to heat sink elements 140 (e.g., by increase an amount of contact points between respective surfaces for heat transfer), and may achieve a higher level of durability for heat sink elements 140, relative to a non-plated heat sink element.

In this way, heat sink assembly 100 enables thermal management of crystal rod 120, thereby enabling maintenance of a precise laser wavelength, improved output efficiency, maintenance of a desired beam quality, and reduced thermal stress relative to another type of heat sink assembly.

As indicated above, FIGS. 1A-1D are provided as an example. Other examples may differ from what is described with regard to FIGS. 1A-1D.

Figure 2:
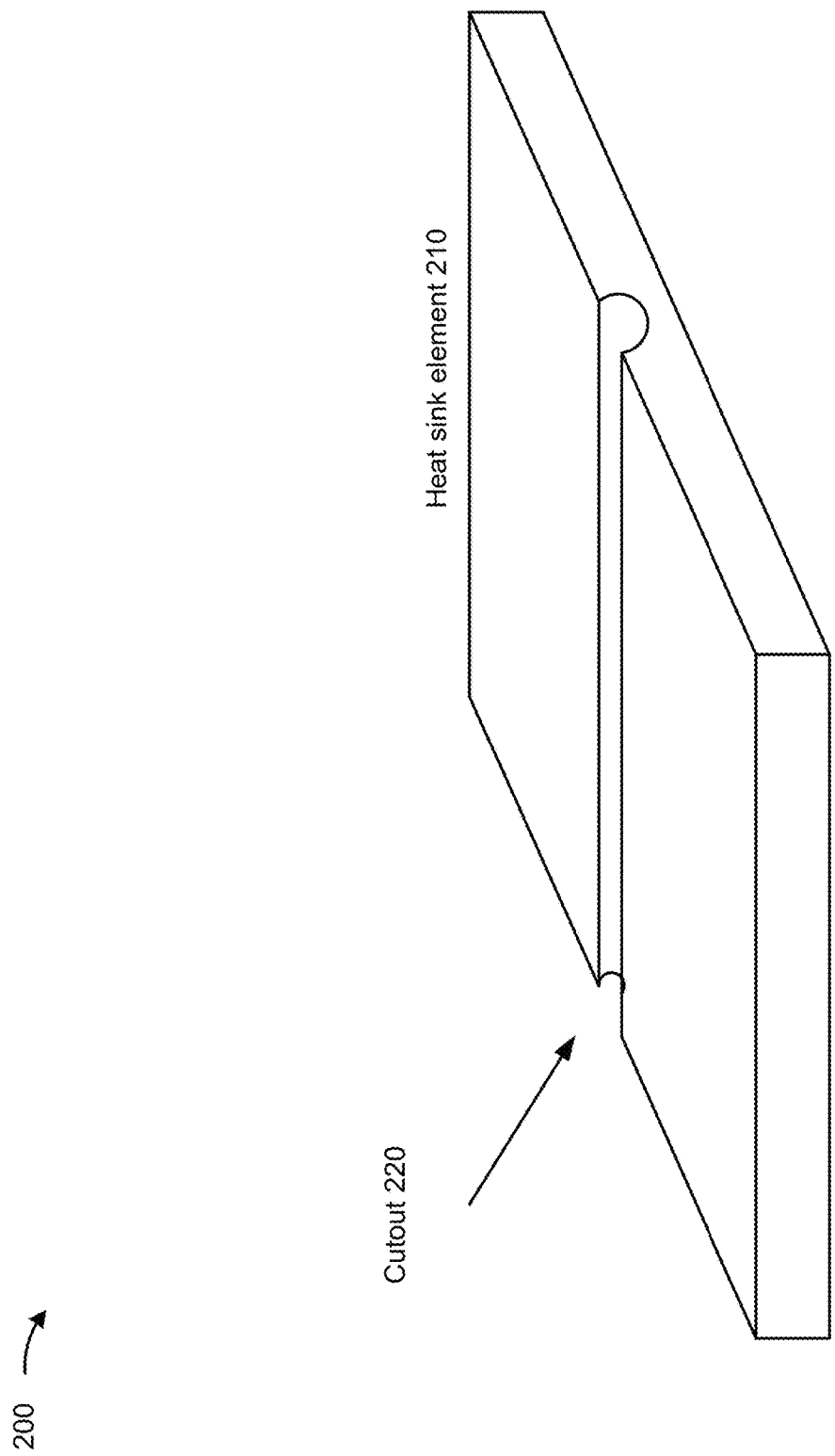
FIG. 2 is a diagram of an example heat sink element described herein.

FIG. 2 is a diagram of an example implementation 200 of a heat sink element. As shown in FIG. 2, example implementation 200 includes a heat sink element 210 (e.g., heat sink element 140), which may be a silver-diamond composite section of a cooling stack of a heat sink assembly. Heat sink element 210 may include a first face or surface with a cutout 220. The cutout 220 may be configured to receive a crystal rod or other optical component. For example, the cutout 220 may have a semi-circular cutout cross-section and/or a cylindrical cutout shape to receive a cylindrical crystal rod. Additionally, or alternatively, for another type of optical component, the cutout 220 may have another type of shape. For example, the cutout 220 may include an area to enable solder or a thermal interface material to flow or expand when pressing a heat sink assembly together. In some implementations, heat sink element 210 may have multiple cutouts 220. For example, when a heat sink assembly is to provide cooling for multiple optical components, such as multiple crystal rods or laser mediums, a heat sink element 210 of the heat sink assembly may include multiple cutouts 220 to receive the multiple optical components. In some implementations, heat sink element 210 may include one or more structural openings (not shown). For example, heat sink element 210 may include one or more openings (not shown) for receiving a structural element, such as a fastener to attach heat sink element 210 to another element of a heat sink assembly (e.g., to a cooling block of a cooling stack).

As indicated above, FIG. 2 is provided as an example. Other examples may differ from what is described with regard to FIG. 2.

Figure 3:
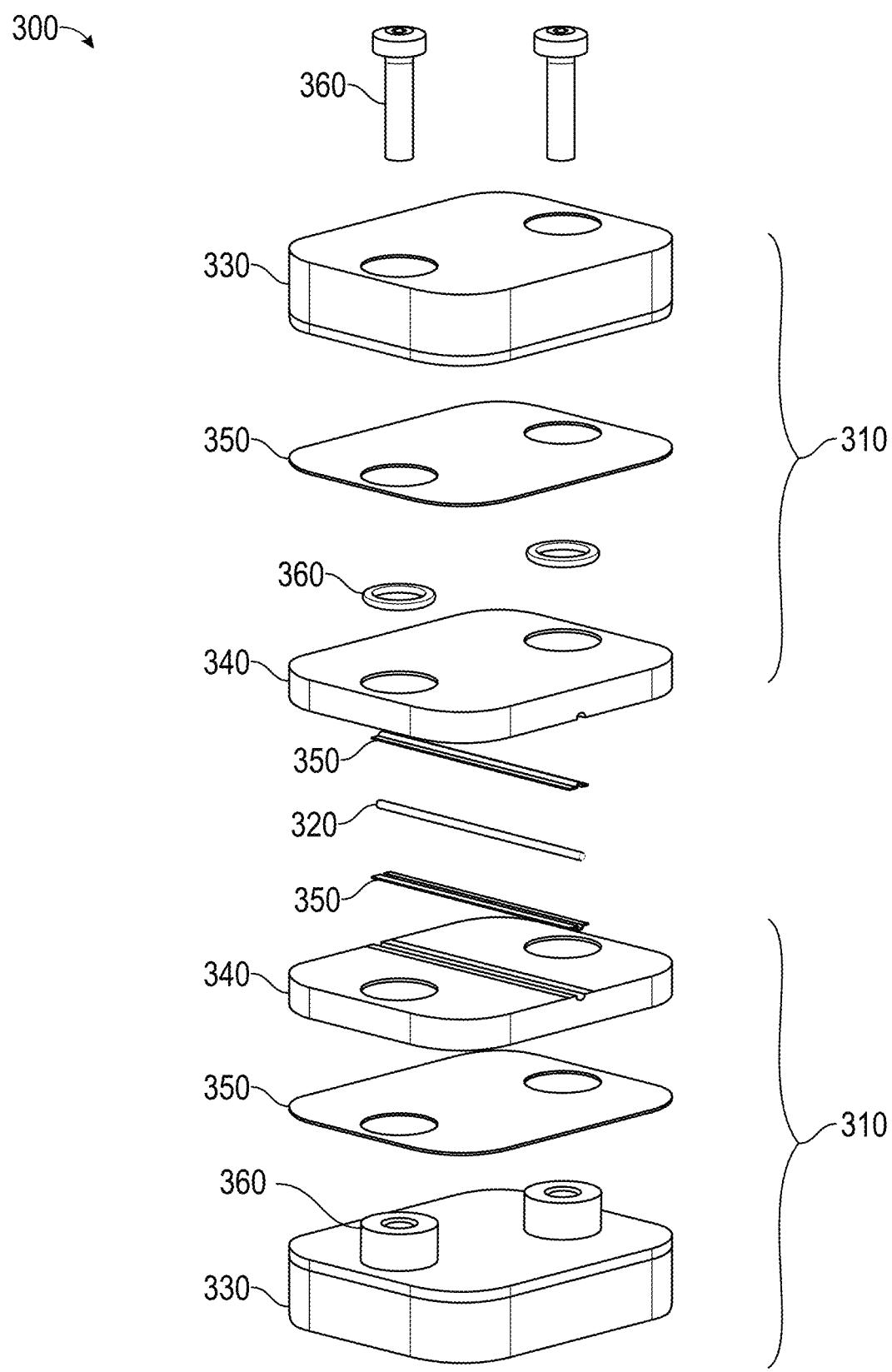
FIG. 3 is a diagram of an example heat sink assembly described herein.

FIG. 3 is a diagram of an example implementation of a heat sink assembly 300. As shown in FIG. 3, heat sink assembly 300 includes a set of cooling stacks 310 (e.g., correspond to cooling stacks 110) and a crystal rod 320 (e.g., corresponding to crystal rod 120). A cooling stack 310 includes a cooling block 330, a heat sink element 340, thermal interface materials 350, and attachment elements 360. In some implementations, attachment elements 360 may include a set of screws, a set of bolts, a set of sockets, a set of O-rings, among other examples.

As indicated above, FIG. 3 is provided as an example. Other examples may differ from what is described with regard to FIG. 3.

Figure 4:
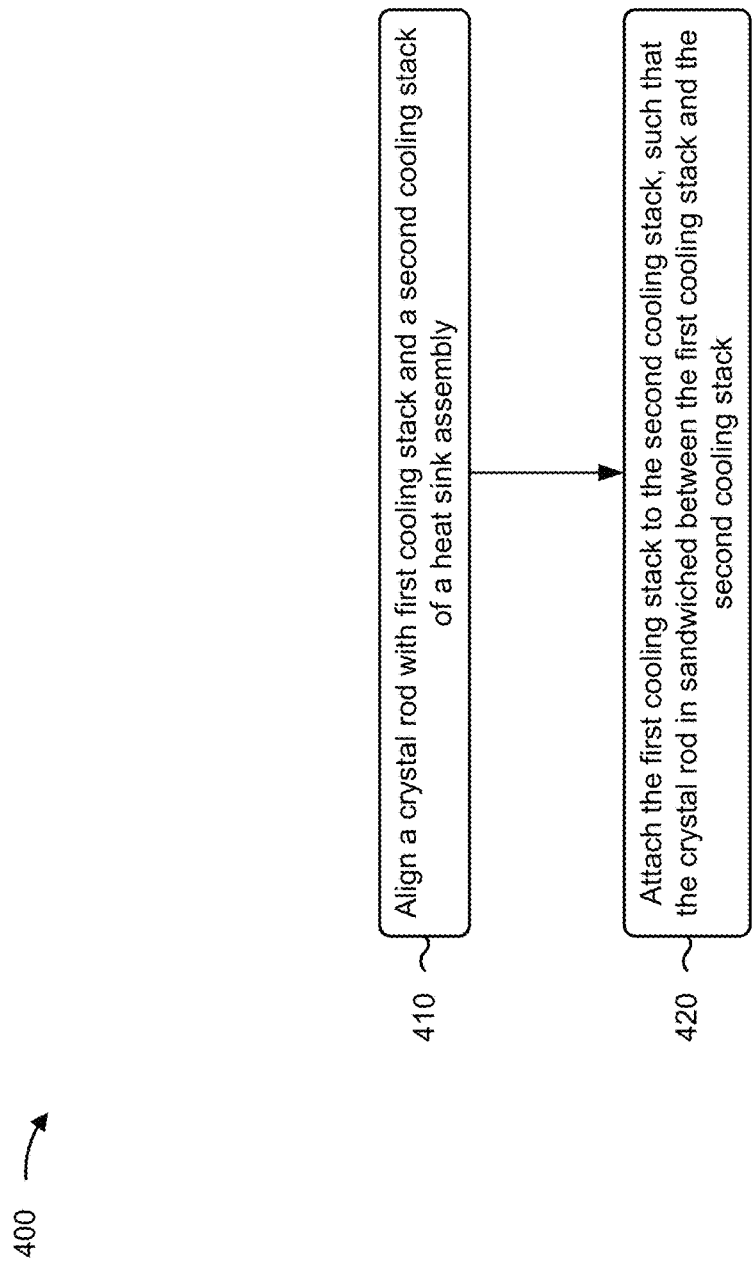
FIG. 4 is a flowchart of an example process relating to manufacturing a heat sink assembly described herein.

FIG. 4 is a flowchart of an example process 400 associated with manufacturing a silver-diamond heatsinks for an optical device or system. In some implementations, one or more process blocks of FIG. 4 are performed by a device (e.g., an attachment, assembly, alignment, or other manufacturing device).

As shown in FIG. 4, process 400 may include aligning a crystal rod with a first cooling stack and a second cooling stack of a heat sink assembly (block 410). For example, the device may align a crystalline orientation of a crystal rod with an orientation of a first cooling stack and a second cooling stack of a heat sink assembly, as described above. In some implementations, the first cooling stack and the second cooling stack have respective faces formed from a silver-diamond composite material. In this case, the crystalline orientation may be a rotational orientation of the crystal rod, which may align to a linear orientation of the heat sink elements (e.g., a respective position of an upper heat sink element and a lower heat sink element).

As further shown in FIG. 4, process 400 may include attaching the first cooling stack to the second cooling stack (block 420). For example, the device may attach the first cooling stack to the second cooling stack, as described above. In some implementations, the first cooling stack is attached to the second cooling stack, such that the crystal rod in sandwiched between a first heat sink element of the first cooling stack and a second heat sink element of the second cooling stack. Additionally, or alternatively, the first cooling stack is attached to the second cooling stack such that the crystalline orientation is maintained by the respective faces of the first cooling stack and the second cooling stack. In other words, a rotational motion of the crystal stack is constrained by attachment of the first cooling stack to the second cooling stack with the crystal rod disposed between the first cooling stack and the second cooling stack.

Process 400 may include additional implementations, such as any single implementation or any combination of implementations described below and/or in connection with one or more other processes described elsewhere herein.

In a first implementation, process 400 includes disposing a thermal interface material between the crystal rod and the respective faces of the first cooling stack and the second cooling stack. For example, the thermal interface material may be disposed on cutouts of the heat sink elements such that the thermal interface material wraps the crystal rod when the first cooling stack is attached to the second cooling stack. Additionally, or alternatively, a thermal interface material may be disposed between elements of a cooling stack, such as between a cooling block and a heat sink element.

In a second implementation, alone or in combination with the first implementation, attaching the first cooling stack to the second cooling stack comprises gluing or soldering the first cooling stack to the second cooling stack.

In a third implementation, alone or in combination with the first or second implementations, process 400 may include positioning a thermal interface material in respective cutouts of the respective heat sink elements, aligning the crystal rod in the respective cutouts, pressing the heat sink elements together under heating to attach the heat sink elements together with the crystal rod disposed therein, and mounting cooling blocks to the heat sinks after the heat sink elements are attached together with the crystal rod disposed therein. For example, when the first cooling stack is attached to the second cooling stack, the first cooling stack and the second cooling stack may only include heat sink elements, in some implementations. In this case, after the first cooling stack is attached to the second cooling stack, cooling blocks may be added to the respective cooling stacks.

Although FIG. 4 shows example blocks of process 400, in some implementations, process 400 includes additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A heat sink assembly, comprising:
   a first cooling stack,
      wherein the first cooling stack includes a metal-diamond composite material;
   a second cooling stack,
      wherein the second cooling stack includes the metal-diamond composite material; and
   a crystal rod,
      wherein the first cooling stack and the second cooling stack are configured to mate and at least partially sandwich the crystal rod,
      wherein a crystalline orientation of the crystal rod is aligned with an orientation of the first cooling stack and the second cooling stack,
      wherein a first coefficient of thermal expansion (CTE) of the crystal rod is matched to a second CTE of the metal-diamond composite material within 25% based on a type of the metal-diamond composite material, and
      wherein the crystal rod is an ytterbium-doped, yttrium-aluminum-garnet laser medium.

2. The heat sink assembly of claim 1, wherein the first cooling stack includes a first heat sink element and a first cooling block attached to a first face of the first heat sink element and the second cooling stack includes a second heat sink element and a second cooling block attached to a first face of the second heat sink element.

3. The heat sink assembly of claim 2, wherein the first heat sink element includes a first cylindrical cutout, in a second face of the first heat sink element, to receive the crystal rod and the second heat sink element includes a second cylindrical cutout, in a second face of the second heat sink element, to receive the crystal rod.

4. The heat sink assembly of claim 1, wherein the first cooling stack and the second cooling stack include respective coolant channels for receiving a liquid coolant.

5. The heat sink assembly of claim 1, wherein the metal-diamond composite material is a gold-coated, silver-diamond composite material.

6. The heat sink assembly of claim 1, wherein the metal-diamond composite material comprises:
   a material with a diamond content in a range from 50% to 80% diamond content by volume.

7. The heat sink assembly of claim 1, wherein the metal-diamond composite material comprises:
   a material with a thermal conductivity value in a range from 200 watts per meter kelvin to 1200 watts per meter kelvin.

8. The heat sink assembly of claim 1, wherein the second CTE of the metal-diamond composite material is in a range from 3 to 8.

9. A heat sink assembly, comprising:
   a first cooling stack including a first metal-diamond composite section;
   a second cooling stack including a second metal-diamond composite section; and
   an optical component,
      wherein the first metal-diamond composite section and the second metal-diamond composite section include respective cutouts to receive the optical component for cooling,
      wherein a crystalline orientation of the optical component is aligned with an orientation of the first cooling stack and the second cooling stack, and
      wherein a first coefficient of thermal expansion (CTE) of the optical component is matched to a second CTE of a metal-diamond composite material of the first cooling stack and the second cooling stack within 25% based on a type of the metal-diamond composite material.

10. The heat sink assembly of claim 9, wherein the optical component includes:
    a crystal rod to be disposed in the respective cutouts of the first metal-diamond composite section and the second metal-diamond composite section.

11. The heat sink assembly of claim 9, wherein the optical component is to be attached to the first metal-diamond composite section and the second metal-diamond composite section using a solder material, an indium material, or a thermal interface material.

12. The heat sink assembly of claim 11, wherein the optical component is to be attached to the first metal-diamond composite section and the second metal-diamond composite section using the thermal interface material and the thermal interface material is a tin material or a graphite material.

13. The heat sink assembly of claim 9, wherein the first metal-diamond composite section or the second metal-diamond composite section includes at least one of:
    a silver-diamond composite material,
    an aluminum-diamond composite material,
    a copper-diamond composite material,
    a magnesium-diamond composite material, or
    a gold-coated material.

14. The heat sink assembly of claim 9, wherein the first cooling stack further comprises a first cooling block attached to the first metal-diamond composite section and wherein the second cooling stack further comprises a second cooling block attached to the second metal-diamond composite section.

15. The heat sink assembly of claim 14, wherein the first cooling block and the second cooling block sandwich the first metal-diamond composite section, the optical component, and the second metal-diamond composite section.

16. The heat sink assembly of claim 14, wherein the first cooling block and the second cooling block include respective channels for receiving water coolant.

17. A method, comprising:
aligning a crystalline orientation of a crystal rod with an orientation of a first cooling stack and a second cooling stack of a heat sink assembly,
wherein the first cooling stack and the second cooling stack have respective faces formed from a metal-diamond composite material, and
wherein a first coefficient of thermal expansion (CTE) of the crystal rod is matched to a second CTE of the metal-diamond composite material within 25% based on a type of the metal-diamond composite material; and
attaching the first cooling stack to the second cooling stack, such that the crystal rod is sandwiched between the first cooling stack and the second cooling stack and the crystalline orientation is maintained by the respective faces of the first cooling stack and the second cooling stack.

18. The method of claim 17, further comprising:
disposing a thermal interface material between the crystal rod and the respective faces of the first cooling stack and the second cooling stack.

19. The method of claim 17, wherein attaching the first cooling stack to the second cooling stack comprises:
gluing or soldering the first cooling stack to the second cooling stack.

20. The heat sink assembly of claim 9, wherein the optical component is an ytterbium-doped, yttrium-aluminum-garnet laser medium.

* * * * *